United States Patent
Alavi et al.

(10) Patent No.: US 9,887,716 B2
(45) Date of Patent: Feb. 6, 2018

(54) INTERFERENCE CANCELATION

(71) Applicant: Intel Corporation, Santa Clara, CA (US)

(72) Inventors: Hossein Alavi, Portland, OR (US); Firouz Behnamfar, San Jose, CA (US); Harry G. Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 14/575,487

(22) Filed: Dec. 18, 2014

(65) Prior Publication Data
US 2016/0182105 A1 Jun. 23, 2016

(51) Int. Cl.
H04B 1/10 (2006.01)
H04B 1/525 (2015.01)
H04J 11/00 (2006.01)
H04B 1/04 (2006.01)
H04B 1/40 (2015.01)

(52) U.S. Cl.
CPC ......... *H04B 1/1027* (2013.01); *H04B 1/0475* (2013.01); *H04B 1/40* (2013.01); *H04B 1/525* (2013.01); *H04J 11/0056* (2013.01)

(58) Field of Classification Search
CPC ............ H04B 7/15564; H04B 7/15571; H04B 7/15578; H04B 7/15585
See application file for complete search history.

(56) References Cited

U.S. PATENT DOCUMENTS

2007/0248938 A1* 10/2007 Ronald .................... G09B 5/06
434/178
2008/0089397 A1* 4/2008 Vetter .................... H04B 1/525
375/220

(Continued)

FOREIGN PATENT DOCUMENTS

CN 1623283 A * 6/2005
CN 1623283 A 6/2005

(Continued)

OTHER PUBLICATIONS

Office Action dated Sep. 21, 2016 for Taiwan Patent Application No. 104137533 (with English translation).

(Continued)

*Primary Examiner* — Mohammed Rachedine
(74) *Attorney, Agent, or Firm* — Schiff Hardin LLP

(57) ABSTRACT

A method and system for self-interference cancellation in a wireless communication device. The wireless communication device can include a first interference detector, a second interference detector, an interference canceler, and a controller. The first interference detector can be configured to detect interference in a received signal. The interference canceler can be configured to perform one or more interference cancellation processes on the received signal. The second interference detector can be configured to detect interference remaining in an interference canceled signal processed by the interference canceler. The controller can be configured to enable or disable the interference canceler based on the detection of the first and/or the second interference detectors.

27 Claims, 7 Drawing Sheets

(56) References Cited

U.S. PATENT DOCUMENTS

| | | | |
|---|---|---|---|
| 2009/0086863 A1* | 4/2009 | Komninakis | H04B 1/10 375/346 |
| 2009/0086864 A1* | 4/2009 | Komninakis | H04B 1/10 375/346 |
| 2012/0093269 A1* | 4/2012 | Yu | H04B 1/71052 375/346 |
| 2014/0145872 A1* | 5/2014 | Shirakawa | G01S 7/2928 342/132 |
| 2014/0153490 A1* | 6/2014 | Lindoff | H04J 11/0023 370/328 |
| 2014/0274132 A1* | 9/2014 | Abdelmonem | H04L 5/0026 455/456.2 |
| 2015/0070204 A1* | 3/2015 | Shirakawa | G01S 7/354 342/90 |

FOREIGN PATENT DOCUMENTS

| | | |
|---|---|---|
| CN | 101394210 A | 3/2009 |
| CN | 102412931 A | 4/2012 |
| CN | 104009773 A | 8/2014 |
| TW | 200904025 A | 1/2009 |

OTHER PUBLICATIONS

Office Action dated Aug. 30, 2017 for Chinese Patent Application No. 201510795131.8.

* cited by examiner

INTERFERENCE CANCELATION

BACKGROUND

Field

Aspects described herein generally relate to interference cancellation, including self-interference cancellation of a received communication signal.

Related Art

Communication signals, including wireless communication signals, can experience interference from one or more external and/or internal sources. In full-duplex communication systems, transmit and receive communication paths can interfere with the other one if not properly and/or sufficiently isolated. Conventional full-duplex communication systems can utilize, for example, transmit (Tx) and receive (Rx) frequency separation, antenna separation, and/or Tx/Rx front-end path isolation using one or more duplexers and/or filters, to reduce Tx leakage into the Rx communication path—referred to as self-interference. Further reduction of Tx leakage into Rx path may be achieved by adaptive interference cancellation techniques. However, these techniques require complex signal processing resulting in increased power consumption of the receiver.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects of the present disclosure.

The aspects of the present disclosure will be described with reference to the accompanying drawings. The drawing in which an element first appears is typically indicated by the leftmost digit(s) in the corresponding reference number.

DETAILED DESCRIPTION

Figure 1:
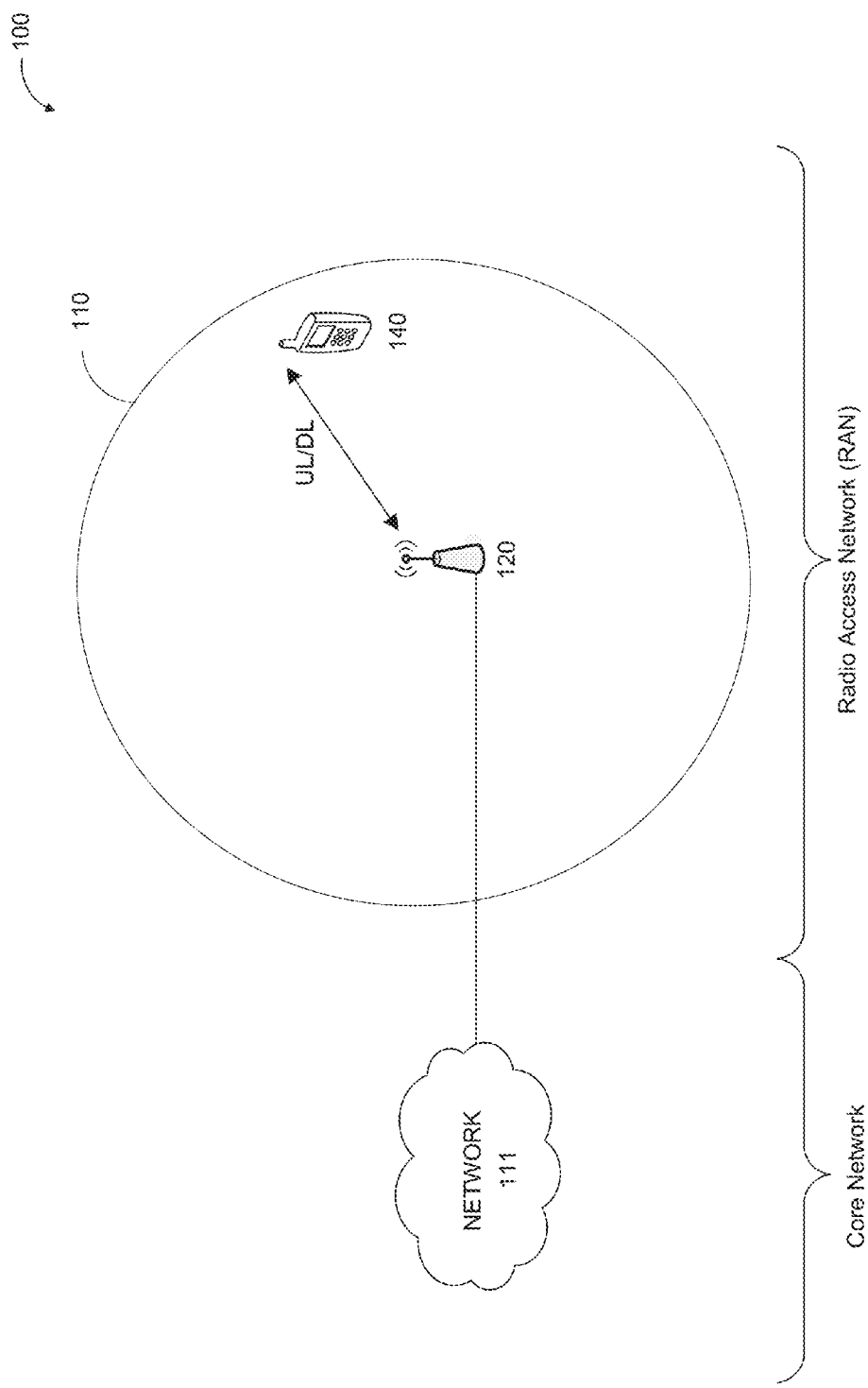
FIG. 1 illustrates an exemplary communication network environment.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor.

For purposes of this discussion, the term "module" shall be understood to include one of software, firmware, hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In the following disclosure, terms defined by mobile communication standards, such as the Long-Term Evolution (LTE) and/or LTE Advanced standards, are sometimes used. For example, the term "eNodeB" or "eNB" is used to refer to what is commonly described as a base station (BS), home base station, or a base transceiver station (BTS) in other standards. The term "User Equipment (UE)" is used to refer to what is commonly described as a mobile station (MS) or mobile terminal in other standards. The LTE and LTE Advanced standards are developed by the 3rd Generation Partnership Project (3GPP) and described in the 3GPP TS 36 standard titled "Evolved Universal Terrestrial Radio Access (E-UTRA); Physical layer procedures," and the International Mobile Telecomunnications-2000 (IMT-2000) and IMT Advanced standards.

As will be apparent to a person of ordinary skill in the art based on the teachings herein, exemplary aspects are not limited to the LTE and/or LTE Advanced standards, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary aspects are not limited to cellular communication networks and can be used or implemented in other kinds of wireless communication access networks, including (but not limited to) Wi-Fi (IEEE 802.11), Bluetooth, Near-field Communication (NFC) (ISO/IEC 18092), ZigBee (IEEE 802.15.4), and/or Radio-frequency identification (RFID), to provide some examples.

Further, exemplary aspects are not limited to the above wireless networks and can be used or implemented in one or more wired networks using one or more well-known wired specifications and/or protocols.

Figure 2:
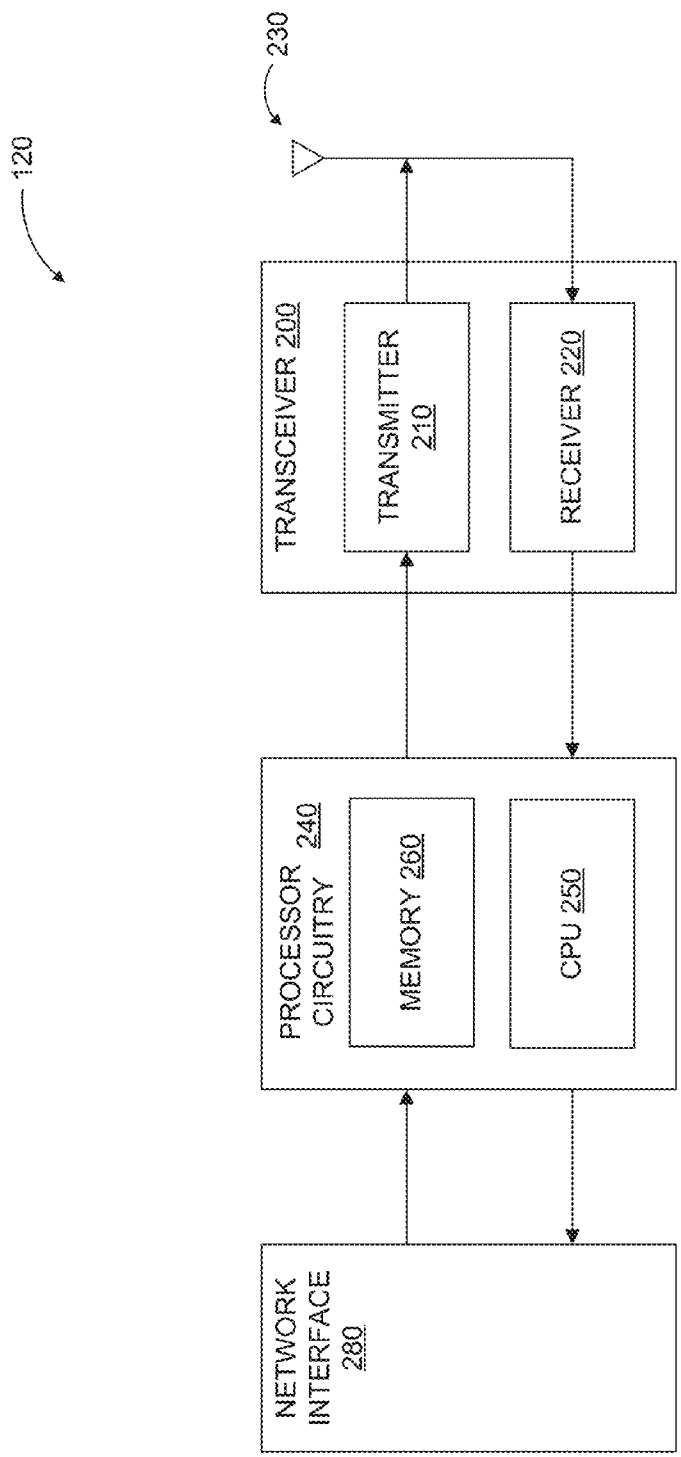
FIG. 2 illustrates a base station according to an exemplary aspect of the present disclosure.
Figure 3:
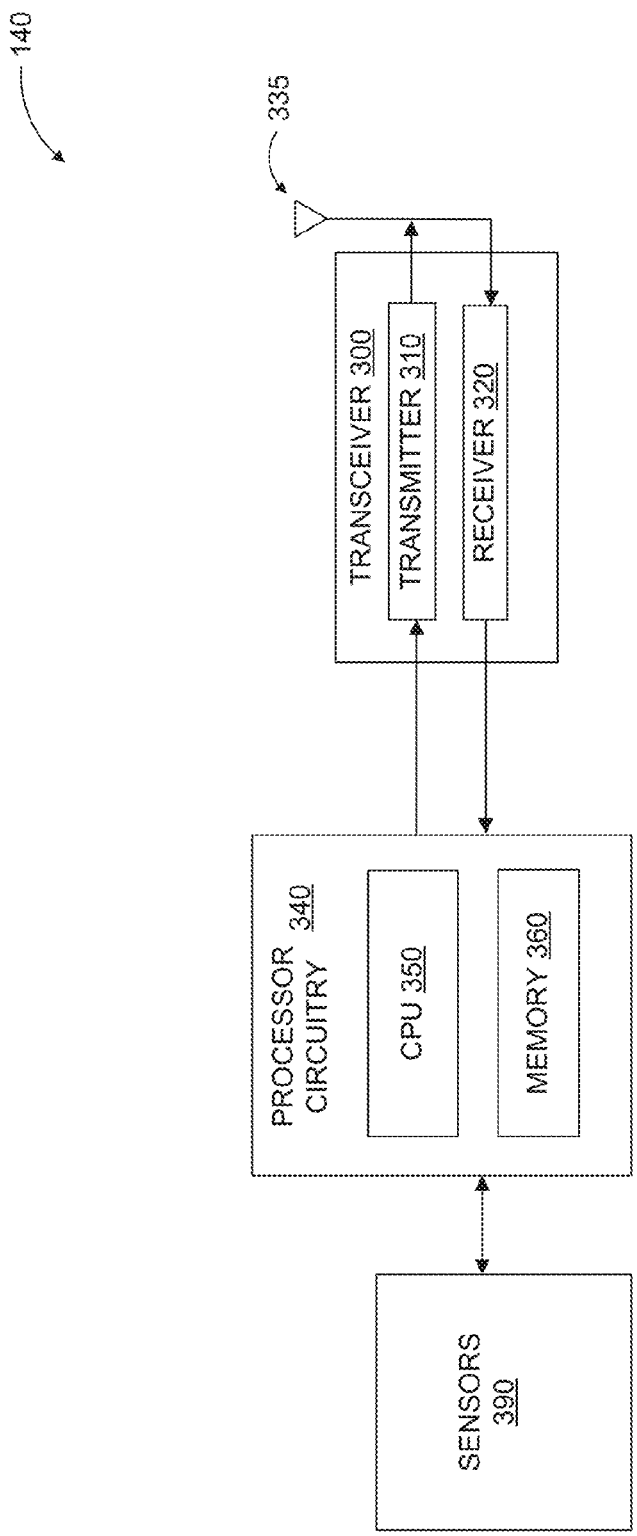
FIG. 3 illustrates a mobile device according to an exemplary aspect of the present disclosure.

The present disclosure is directed to an interference cancellation device configured to cancel and/or substantially reduce interference, including self-interference, within a received and/or transmitted communication signal. In exemplary aspects, the interference cancellation device can determine the necessity and/or effectiveness of one or more interference cancellation processes on a communication signal. In an exemplary aspect of the present disclosure, the interference cancellation device is included in a mobile device (e.g., laptop computer, a tablet computer, a mobile telephone, etc.) and configured to cancel and/or substantially reduce interference, including self-interference, within a communication signal received and/or transmitted by the mobile device. As described in detail below, FIG. 1-3 illustrate an example communication environment, and an example mobile device and base station configured to operate within the communication environment.

FIG. 1 illustrates an example communication environment 100 that includes a radio access network (RAN) and a core network. The RAN includes one or more base stations 120 and one or more mobile devices 140. The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base stations 120 communicate with one or more service providers and/or one or more other base stations 120 via the backhaul communication network 111. In an exemplary aspect, the backhaul communication network is an internet protocol (IP) backhaul network.

The number of base stations 120, mobile devices 140, and/or networks 111 are not limited to the exemplary quantities illustrated in FIG. 1, and the communication environment 100 can include any number of the various components as would be understood by one of ordinary skill in the relevant art(s).

In an exemplary aspect, the base station 120 and mobile device 140 each include one or more processors, circuitry, and/or logic that are configured to communicate via one or more wireless technologies. The mobile device 140 can be further configured to support co-existing wireless communications with one or more other mobile devices. The mobile device 140 can include, for example, a transceiver having one or more processors, circuitry, and/or logic that are configured to transmit and/or receive wireless communications via one or more wireless technologies within the communication environment 100. The base station 120 can include one or more processors, circuitry, and/or logic that are configured to: (1) receive one or more wired communications via one or more well-known wired technologies from the backhaul communication network 111 and/or from one or more other base stations 120, and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies to the backhaul communication network 111 and/or to one or more other base stations 120, and (3) to transmit and/or receive wireless communications via one or more wireless technologies within the communication environment 100. The wireless technologies can include one or more of the wireless protocols discussed above. In an exemplary aspect, the base station(s) 120 are configured to transmit and/or receive wireless communications conforming to the 3GPP's LTE specification. The one or more processors can include (and be configured to access) one or more internal and/or external memories that store instructions and/or code that, when executed by the processor(s), cause the processor(s) to perform one or more operations to facilitate communications via one or more wireless and/or wired technologies as discussed herein.

In an exemplary aspect, the mobile device 140 can be configured to communicate with the base station 120 in a serving cell or sector 110 of the communication environment 100. For example, the mobile device 140 receives signals on one or more downlink (DL) channels from the base station 120, and transmits signals to the base station 120 on one or more respective uplink (UL) channels.

In exemplary aspects, the mobile devices 140 can be configured to communicate with one or more other mobile devices utilizing one or more device-to-device communication connections (e.g., using one or more personal access networks (PANs)) via one or more wireless communication protocols—such as LTE, Bluetooth, WLAN, etc. The one or more mobile devices 140 can be within, or outside of, the serving cell or sector 110.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the mobile device 140 may be a stationary device, including, for example, a stationary computing device—such as a personal computer (PC), a desktop computer, a computerized kiosk, and an automotive/aeronautical/maritime in-dash computer terminal.

In an exemplary aspect, the base stations 120 include one or more processors, circuitry, and/or logic that are configured for communications conforming to the IEEE's 802.11 WLAN specification (e.g., the base stations are wireless local area network (WLAN) base stations). Similarly, the mobile device 140 includes one or more processors, circuitry, and/or logic that are configured for communications conforming to the IEEE's 802.11 WLAN specification. The one or more processors, circuitry, and/or logic of the mobile device 140 can be further configured for communications conforming to one or more other 3GPP and/or non-3GPP protocols via one or more device-to-device communication networks established with one or more other mobile devices. In this example, the communication network 100 is wireless local area network (WLAN) conforming to IEEE's 802.11 WLAN specification. In an exemplary aspect, the communication of the mobile device 140 with one or more other mobile devices 140 can be a device-to-device communication that bypasses the base stations 120.

Those skilled in the relevant art(s) will understand that the base station 120 and the mobile device(s) 140 are not limited to IEEE's 802.11 WLAN specification, and the base station 120 and/or the mobile device(s) 140 can be configured for wireless communications conforming to one or more other 3GPP and/or non-3GPP wireless protocols in addition to, or in the alternative to, the wireless protocols discussed herein.

FIG. 2 illustrates the base station 120 according to an exemplary aspect of the present disclosure. For example, the base station 120 can include a transceiver 200 and a network interface 280, each communicatively coupled to processor circuitry 240.

The transceiver 200 includes one or more processors, circuitry, and/or logic that are configured to transmit and/or receive wireless communications via one or more wireless technologies within the communication environment 100. For example, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary aspect, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in aspects where the transceiver 200 is configured for such other communications conforming to the other protocols.

The network interface 280 includes one or more processors, circuitry, and/or logic that are configured to transmit and/or receive communications via one or more wired technologies to/from the backhaul communication network 111. Those skilled in the relevant art(s) will recognize that the network interface 280 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

FIG. 3 illustrates the mobile device 140 according to an exemplary aspect of the present disclosure. The mobile device 140 can include processor circuitry 340 communicatively coupled to one or more transceivers configured to communicate with one or more 3GPP and/or non-3GPP communication protocols. That is, the mobile device 140 can be configured for wireless communications conforming to one or more wireless protocols defined by 3GPP and/or one or more non-3GPP wireless protocols. In an exemplary aspect, the mobile device 140 includes a transceiver 300. In an exemplary aspect, the transceiver 300 is configured for wireless communications conforming to 3GPP's LTE specification. In this example, the transceiver 200 can be referred to as LTE transceiver 300. Those skilled in the relevant art(s) will understand that the transceiver 300 is not limited to communication conforming to 3GPP's LTE specification, and can be configured for communications that conform to one or more other 3GPP protocols and/or one or more non-3GPP protocols. For example, the transceiver 300 can be configured for wireless communications conforming to one or more other 3GPP and/or non-3GPP wireless protocols (e.g., NFC, Bluetooth, etc.) in addition to, or in the alternative to, the LTE specification and/or one or more of the wireless protocols discussed herein.

The transceiver 300 includes one or more processors, circuitry, and/or logic that are configured for transmitting and/or receiving wireless communications conforming to one or more wireless protocols (e.g., 3GPP's LTE specification). In particular, the transceiver 300 can include a transmitter 310 and a receiver 320 that have one or more processors, circuitry, and/or logic configured for transmitting and receiving wireless communications conforming to one or more wireless protocols (e.g., 3GPP's LTE specification), respectively, via one or more antennas 335. Transceiver 300 need not be limited to, for example, LTE and could operate according to one or more other 3GPP and/or non-3GPP protocols, as will be understood by those skilled in art.

In exemplary aspects, the transceiver 300 can include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antenna 335 may include an integer array of antennas, and that the antennas may be capable of both transmitting and receiving wireless communication signals.

The processor circuitry 340 includes one or more processors, circuitry, and/or logic that are configured to control the overall operation of the mobile device 140, such as the operation of the transceiver 300—including, for example, transmitting and/or receiving of wireless communications via the transceiver 300, and/or perform one or more baseband processing functions (e.g., media access control (MAC), encoding/decoding, modulation/demodulation, data symbol mapping, error correction, etc.); the running of one or more applications and/or operating systems; power management (e.g., battery control and monitoring); display settings; volume control; and/or user interactions via one or more user interfaces (e.g., keyboard, touchscreen display, microphone, speaker, etc.).

In an exemplary aspect, the processor circuitry 340 includes one or more processors (CPUs) 350—such as, for example, one or more baseband processors and/or one or more application processors. As would be understood by those skilled in the relevant arts, the one or more processors (CPUs) 350 may be embodied as a single chip and/or die, or as multiple chips and/or dies.

In an exemplary aspect, the mobile device 140 includes one or more other transceivers (not shown) configured to communicate via one or more 3GPP protocols, one or more non-3GPP protocols, and/or one or more other well-known communication technologies. In an exemplary aspect, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, the mobile device 140 can include one or more positional and/or movement sensors 390 (e.g., GPS, accelerometer, gyroscope sensor, etc.) implemented in (and/or in communication with) the mobile device 140. Here, the location and/or movement of the mobile device 140 can be determined using one or more transceivers configured for navigation purposes, one or more of the positional and/or movement sensors 390, and/or one or more positional determinations using signal characteristics relative to one or more base stations and/or access points.

Figure 4:
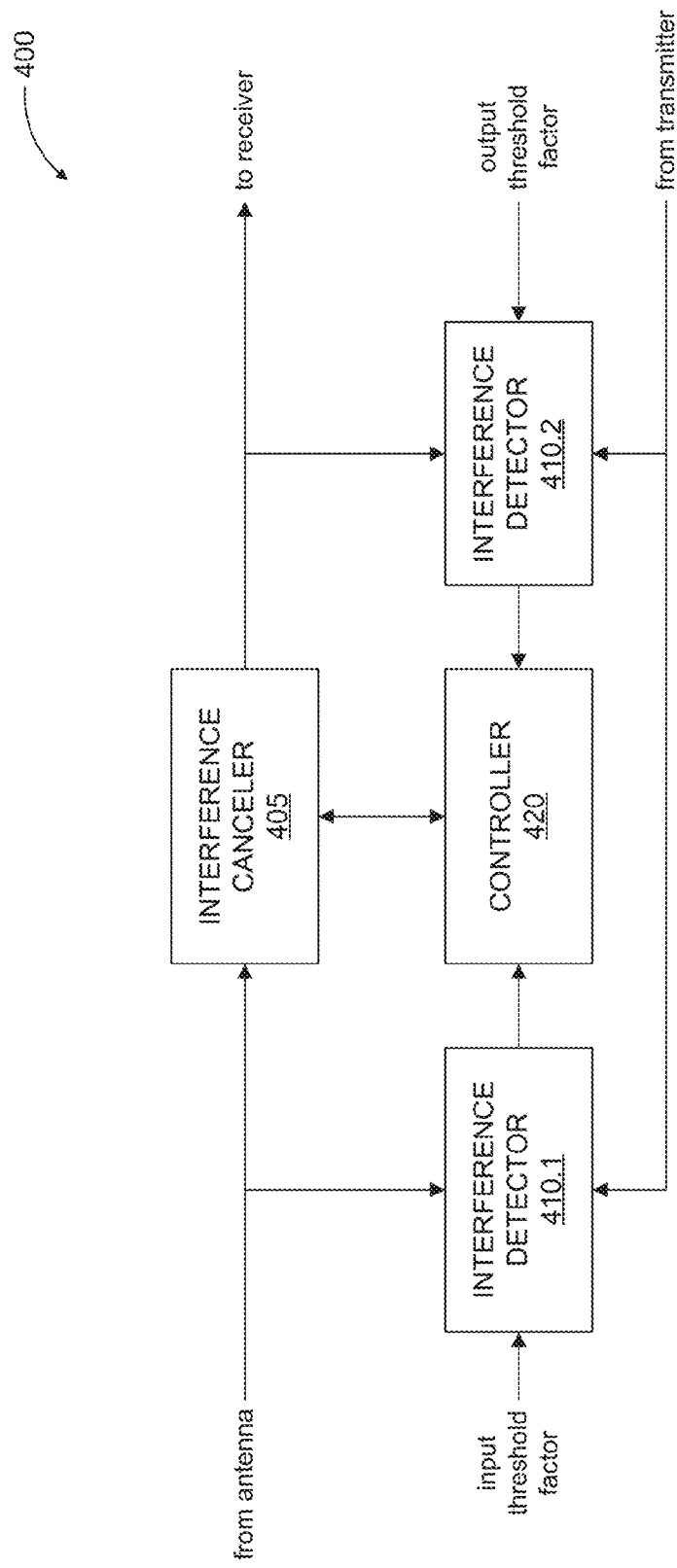
FIG. 4 illustrates an interference cancellation device according to an exemplary aspect of the present disclosure.

FIG. 4 illustrates an interference cancellation device 400 according to an exemplary aspect of the present disclosure. In an exemplary aspect, the interference cancellation device 400 includes an interference canceler 405, a first interference detector 410.1, a second interference detector 410.2, and a controller 420. In one or more exemplary aspects, the interference cancellation device 400 can be included in, or otherwise communicatively coupled to, the mobile device 140. In aspects in which the interference cancellation device 400 is comprised within the mobile device 140, the interference cancellation device 400 can be an exemplary aspect of the processor circuitry 340. In this example, one or more of the processors (CPUs) 350 can be configured to perform one or more of the operations of the interference cancellation device 400 described herein. Further, the one or more CPUs 350 can be configured to access memory 360 (and/or one or more external memories) that store instructions and/or code that, when executed by the CPU(s) 350, cause the CPU(s) 350 to perform one or more operations associated with the interference cancellation device 400 as described herein.

The interference canceler 405 can include one or more processors, circuitry, and/or logic that are configured to perform one or more interference cancellation processes on a signal to cancel and/or suppress interference within the signal. For example, the interference canceler 405 can be configured to perform one or more interference cancellation processes on a signal received by the interference cancellation device 400. In an exemplary aspect, the received signal is a signal received by, for example, mobile device 140 via antenna 335. The interference canceler 405 is not limited to performing interference cancellation processes on received signals and can be configured to perform one or more interference cancellation processes on signals to be transmitted by, for example, the mobile device 140 via the antenna 335.

In operation, the interference canceler 405 can be configured to receive a signal that has been received via the antenna 335 of the mobile device 140, perform one or more interference cancellation processes on the received signal, and generate and provide an interference canceled signal to, for example, receiver 320 of the mobile device 140.

In an exemplary aspect, the interference canceler 405 can be configured to perform one or more interference cancellation processes on a received signal utilizing a portion of one or more transmitted signals, one or more transmitted signals, and/or information associated with one or more transmitted signals and/or one or more signals to be transmitted. In an exemplary aspect, the interference canceler 405 can be configured to utilize one or more pilot signals, preambles, synchronization sequences, and/or spreading sequences within (and/or associated with) one or more transmitted signals and/or one or more signals to be transmitted, to perform one or more interference cancellation processes. In an exemplary aspect, the interference canceler 405 can be configured to utilize one or more demodulation reference signal (DMRS) symbols of one or more physical uplink shared channels (PUSCHs) within (and/or associated with) one or more transmitted signals and/or one or more signals to be transmitted, to perform one or more interference cancellation processes.

In operation, the interference canceler 405 can be configured to perform one or more interference cancellation processes based on a signal received from controller 420. For example, controller 420 can be configured to generate and provide an enable/disable signal to the interference canceler 405 to instruct the interference canceler 405 to perform one or more interference cancellation processes on a received signal. In operation, if the interference canceler 405 receives an enable/disable signal that indicates that interference cancellation processes are disabled, the interference canceler 405 can be configured to bypass a communication signal received from antenna 335 to the receiver 320 without performing an interference cancellation process on the received communication signal.

Each of the interference detectors 410 can include one or more processors, circuitry, and/or logic that are configured to detect interference within a received signal, and based on the detection, generate and output an interference detection signal that is indicative of the presence of interference within the received signal. In operation, one or more of the interference detectors 410 can be configured to provide the interference detection signal to the controller 420. In an exemplary aspect, interference detector 410.1 can be configured to detect interference within a signal received by, for example, mobile device 140 via antenna 335. Interference detector 410.2 can be configured to detect interference within a signal received from the interference canceler 405. For example, the interference detector 410.2 can be configured to detect remaining interference within a communication signal previously subjected to one or more interference cancellation processes by the interference canceler 405 (e.g., an interference canceled signal). Based on these detections, interference detectors 410.1 and 410.2 can be configured to provide respective interference detection signals to the controller 420.

In an exemplary aspect, one or more of the interference detectors 410 can be configured to correlate a received signal with, for example, a portion of one or more transmitted signals, one or more transmitted signals, and/or information associated with one or more transmitted signals and/or one or more signals to be transmitted, to detect interference within the received signal. In an exemplary aspect, one or more of the interference detectors 410 can be configured to utilize one or more pilot signals, preambles, synchronization sequences, and/or spreading sequences within (and/or associated with) one or more transmitted signals and/or one or more signals to be transmitted, to perform interference detection. In an exemplary aspect, one or more of the interference detectors 410 can be configured to utilize one or more demodulation reference signal (DMRS) symbols of one or more physical uplink shared channels (PUSCHs) within (and/or associated with) one or more transmitted signals and/or one or more signals to be transmitted, to perform interference detection.

In an exemplary aspect, the interference detectors 410 can be configured to perform one or more matched-filtering processes on the received signal, and/or one or more other well-known filtering processes as would be understood by one of ordinary skill in the relevant art(s), to detect interference within the received signal. The matched-filtering processes and/or other filtering processes can be in addition to (or an alternative) to correlating the received signals as described herein.

In an exemplary aspect, one or more of the interference detectors 410 can be configured to detect interference and/or interference remaining within a signal based on an interference threshold value. For example, one or more the interference detectors 410 can be configured to generate one or more interference threshold values and to compare one or more interference threshold values with one or more received signals to detect interference and/or interference remaining within the received signal(s). In an exemplary aspect, one or more of the interference detectors 410 can be configured to compare one or more interference threshold values to one or more correlated signals (e.g., received signal(s) previously correlated by one or more of the interference detectors 410). In an exemplary aspect, one or more of the interference detectors 410 can be configured to determine a fading memory average of one or more correlated signals to generate the interference threshold value(s).

In an exemplary aspect, one or more of the interference detectors 410 can be configured to count the number of the signal-to-threshold comparisons that satisfy a predetermined condition (e.g., how many comparisons result in signals exceeding the threshold). The interference detector(s) 410 can then be configured to compare the determined count to a count threshold. Based on this comparison, the interference detector(s) 410 can be configured to detect interference and/or interference remaining within a signal.

In an exemplary aspect, one or more of the interference detectors 410 can be configured to generate one or more interference threshold values based on a threshold factor. The threshold factor adjusts the magnitude of the interference threshold value(s) to control the sensitivity of the corresponding interference detector 410. For example, the interference detector(s) 410 can be configured to generate a smaller interference threshold value when the value of the threshold factor is reduced. In this example, the detection of interference by the corresponding interference detector 410 will increase as the interference detector 410 will be comparing the received signal with a smaller interference threshold value. In an exemplary aspect, interference detector 410.1 can be configured to generate one or more interference threshold values based on an input threshold factor and interference detector 410.2 can be configured to generate one or more interference threshold values based on an output threshold factor. In this example, the input threshold factor and the output threshold factor can be equal, or the respective factors can have different values.

The controller 420 can include one or more processors, circuitry, and/or logic that are configured to control the overall operation of the interference cancellation device 400—such as, for example, enabling/disabling the performance of one or more interference cancellation processes. In an exemplary aspect, the controller 420 can be configured to generate and provide an enable/disable signal to the interference canceler 405 to control the interference canceler 405 to perform or not perform one or more interference cancellation processes on a received signal. In an exemplary aspect, the controller 420 can be configured to generate an enable/disable signal based on one or more received interference detection signals generated by one or more of the interference detectors 410. In operation, the controller 420 can be configured to, for example, generate an enable signal that controls the interference canceler 405 to perform one or more interference cancellation processes in response to the controller 420 receiving an interference detection signal from the interference detector 410.1 and/or the interference detector 410.2. In this example, if the controller 420 receives a disable signal from one or more of the interference detectors 410 (or does not receive an enable signal from both of the interference detectors 410), the controller 420 can be configured to control the interference canceler 405 to bypass one or more received signals to, for example, receiver 320 without performing one or more interference cancellation processes on the received signal.

In an exemplary aspect, the controller 420 can be configured to generate an enable signal to control the interference canceler 405 to perform one or more interference cancellation processes in response to the controller 420 receiving an interference detection signal from the interference detector 410.1 that indicates interference within the received signal that is, for example, above an interference threshold value, and in response to receiving an interference detection signal from the interference detector 410.2 that indicates that the interference remaining within the interference canceled signal is, for example, below an interference threshold value. That is, the controller 420 can be configured to determine whether an amount of interference within a received signal necessitates interference cancellation processes to be performed on the received signal, and whether such processes were sufficiently successful in canceling the detected interference.

Figure 5:
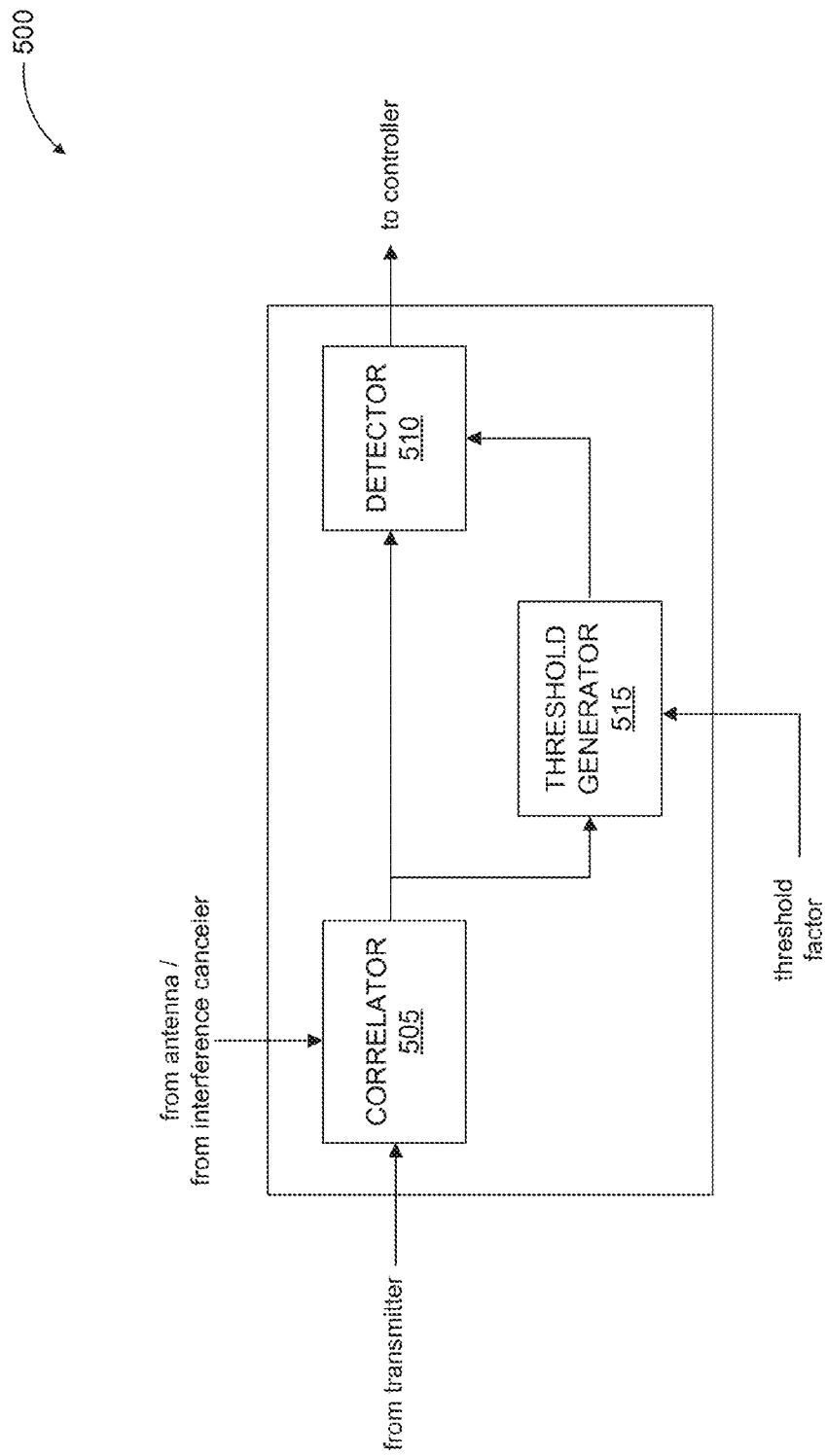
FIG. 5 illustrates an interference detector according to an exemplary aspect of the present disclosure.

FIG. 5 illustrates an interference detector device 500 according to an exemplary aspect of the present disclosure. Interference detector 500 is one exemplary aspect of one or more of the interference detectors 410 illustrated in FIG. 4.

Interference detector 500 can include one or more processors, circuitry, and/or logic that are configured to detect interference within a received signal, and based on the detection, generate and output an interference detection signal that is indicative of the presence of interference within the received signal. Interference detector 500 can include a correlator 505 communicatively coupled to a detector 510 and a threshold generator 515.

Correlator 505 can include one or more processors, circuitry, and/or logic that are configured to correlate a received signal with: a portion of one or more transmitted signals, one or more transmitted signals, and/or information associated with one or more transmitted signals and/or one or more signals to be transmitted. In an exemplary aspect, correlator 505 can be configured to generate a correlated signal based on a received signal (e.g., a received communication signal) from, for example, antenna 335 of the mobile device 140 and: a portion of one or more transmitted signals, one or more transmitted signals, and/or information associated with one or more transmitted (or to be transmitted) signals. For example, the correlator 505 can be configured to receive a communication signal from antenna 335 and a portion of a transmitted signal from the transmitter 310, and generate a correlated signal based off the received signals. In an exemplary aspect, the correlator 505 can be configured to integrate two or more subframes of the received signal to generate a correlated signal.

In an exemplary aspect, the correlator 505 can be configured to generate a correlated signal based on an interference canceled signal received from interference canceler 405 and: a portion of one or more transmitted signals, one or more transmitted signals, and/or information associated with one or more transmitted (or to be transmitted) signals. For example, the correlator 505 can be configured to receive an interference canceled signal from interference canceler 405 and a portion of a transmitted signal from the transmitter 310, and generate one or more correlated signals based off the received signals. In an exemplary aspect, the correlator 505 can be configured to provide one or more of the correlated signals to the detector 510 and/or the threshold generator 515.

In an exemplary aspect, the correlator 505 can be configured to calculate a root mean square (rms) value of the correlated signal. In this example, the correlator 505 can provide the rms correlated signal to the detector 510 and/or the threshold generator 515 for further processing as described herein. The correlator 505 is not limited to calculating rms values of the correlated signal, and the correlator 505 can be configured to calculate the absolute value of the correlated signal, the amplitude of the correlated signal, and/or apply one or more other well-known mathematical processes on the correlated signal as would be understood by one of ordinary skill in the relevant art(s).

In an exemplary aspect, a portion of one or more transmitted signals, one or more transmitted signals, and/or information associated with one or more transmitted (or to be transmitted) signals includes one or more pilot signals, preambles, synchronization sequences, and/or spreading sequences within (and/or associated with) one or more transmitted signals and/or one or more signals to be transmitted. In this example, the correlator 505 can be configured to utilize one or more pilot signals, preambles, synchronization sequences, and/or spreading sequences within (and/or associated with) one or more transmitted signals and/or one or more signals to be transmitted, to perform one or more correlation processes.

In an exemplary aspect, a portion of one or more transmitted signals, one or more transmitted signals, and/or information associated with one or more transmitted (or to be transmitted) signals includes one or more demodulation reference signal (DMRS) symbols of one or more physical uplink shared channels (PUSCHs) within (and/or associated with) one or more transmitted signals and/or one or more signals to be transmitted. In this example, the correlator 505 can be configured to utilize one or more demodulation reference signal (DMRS) symbols of one or more physical uplink shared channels (PUSCHs) within (and/or associated with) one or more transmitted signals and/or one or more signals to be transmitted to perform one or more correlation processes.

Threshold generator 515 can include one or more processors, circuitry, and/or logic that are configured to generate one or more interference threshold values and to provide the generated interference threshold value(s) to detector 510. In an exemplary aspect, the threshold generator 515 can be configured to generate one or more interference threshold values based on a correlated signal received from the correlator 505.

In an exemplary aspect, threshold generator 515 can be configured to determine a fading memory average of one or more correlated signals to generate the interference threshold value(s). The threshold generator 515 is not limited to determining a fading memory average of the one or more correlated signals, and the threshold generator 515 can be configured to perform low-pass filtering on the correlated signal to generate the interference threshold value(s) and/or one or more other well-known averaging/filtering processes on the correlated signal as would be understood by one of ordinary skill in the relevant art(s).

The threshold generator 515 can be further configured to generate one or more interference threshold values based on a threshold factor. In this example, the threshold factor adjusts the magnitude of the interference threshold value(s) to control the sensitivity of the interference detector 500. For example, the interference detector 500 can be configured to generate a smaller interference threshold value when the value of the threshold factor is reduced. In this example, the detection of interference by the interference detector 500 will increase as the detector 510 will be comparing a received signal (e.g., a correlated signal received from correlator 505) with a smaller interference threshold value.

Detector 510 can include one or more processors, circuitry, and/or logic that are configured to detect interference and/or interference remaining within a signal based on an interference threshold value. In an exemplary aspect detector 510 can be configured to generate and output an interference detection signal that is indicative of the presence of interference and over interference remaining within the received signal. In operation, the detector 510 can be configured to provide the interference detection signal to the controller 420.

In operation, the detector 510 can be configured to receive one or more interference threshold values from the threshold generator 515 and compare the received interference threshold value(s) with one or more received signals. Based on the comparison, the detector 515 can be configured to generate one or more interference detection signals, which can be utilized by the controller 420 to identify the presence of interference and/or interference remaining within the received signal(s).

Figure 6:
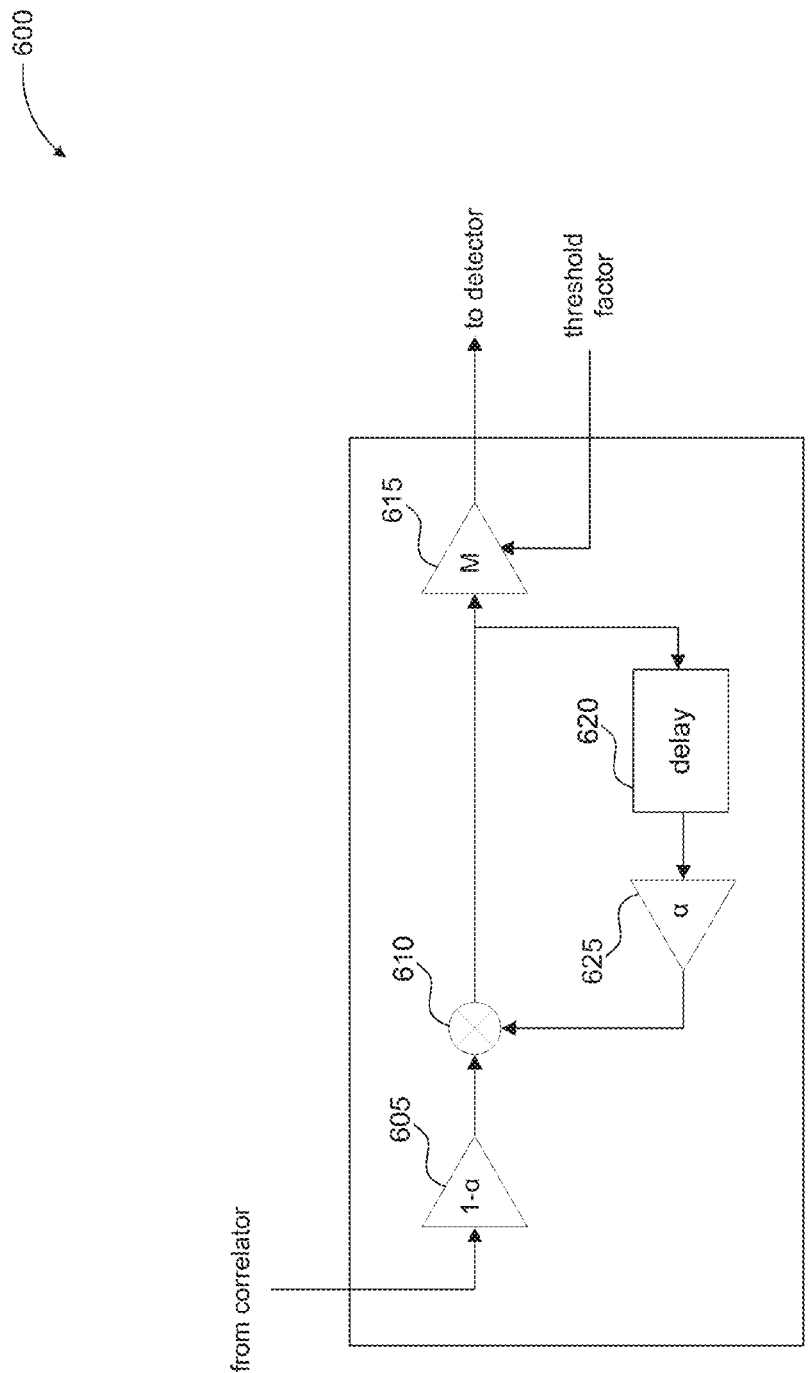
FIG. 6 illustrates a threshold generator according to an exemplary aspect of the present disclosure.

FIG. 6 illustrates a threshold generator 600 according to an exemplary aspect of the present disclosure. Threshold generator 600 is one exemplary aspect of threshold generator 515 illustrated in FIG. 5.

Threshold generator 600 can include one or more processors, circuitry, and/or logic that are configured to generate one or more interference threshold values and to provide the generated interference threshold value(s) to detector 510. The threshold generator 600 can include correlated signal weight module 605, an adder 610, a multiplier 615, a delay module 620 and signal history weight module 625.

The correlated signal weight module 605 can include one or more processors, circuitry, and/or logic that are configured to receive a correlated signal from correlator 505 and to generate a weighted correlated signal based on a weight factor α. In an exemplary aspect, the weight factor α has a value between, for example, 0 to 1. In operation, the correlated signal weight module 605 can be configured to multiply the received correlated signal by 1−α. For example, if the value of alpha is 0.9, the weighted correlated signal will have a magnitude that is 10% of the magnitude of the correlated signal.

The adder 610 can include one or more processors, circuitry, and/or logic that are configured to add two or more inputs together to generate a signal representing the sum of the two or more inputs. In an exemplary aspect, the adder 610 can be configured to add the weighted correlated signal from the correlated signal weight module 605 to the output of the signal history weight module 625 to generate a fading memory average correlated signal.

The delay module 620 can include one or more processors, circuitry, and/or logic that are configured to receive a fading memory average correlated signal generated by the adder 610 and delay the fading memory average correlated signal by a predetermined time value.

The history weight module 625 can include one or more processors, circuitry, and/or logic that are configured to receive the delayed fading memory average correlated signal from the delay module 620 and to generate a weighted history signal based on the weight factor $\alpha$. In operation, the history weight module 625 can be configured to multiply the delayed fading memory average correlated signal by $\alpha$. For example, if the value of alpha is 0.9, the weighted history signal will have a magnitude that is 90% of the magnitude of the delayed fading memory average correlated signal. In this example, the fading memory average correlated signal will represent a weighted average comprising 10% of the correlated signal and 90% of the historic values of the correlated signal. That is, for larger values of $\alpha$, the fading memory average correlated signal will be weighted more towards historic values compared to the current value of the correlated signal, while for smaller values of $\alpha$, the fading memory average correlated signal will be weighted more towards the current value of the correlated signal compared to the historic values.

The multiplier 615 can include one or more processors, circuitry, and/or logic that are configured to multiply two or more inputs together to generate a multiple output. In an exemplary aspect, the multiplier 615 can be configured to multiply the fading memory average correlated signal with a threshold factor $\lambda$ to generate one or more interference threshold values. In operation, the threshold factor $\lambda$ adjusts the magnitude of the one of more interference threshold values, and can be used to adjust the sensitivity of detector 510.

Figure 7:
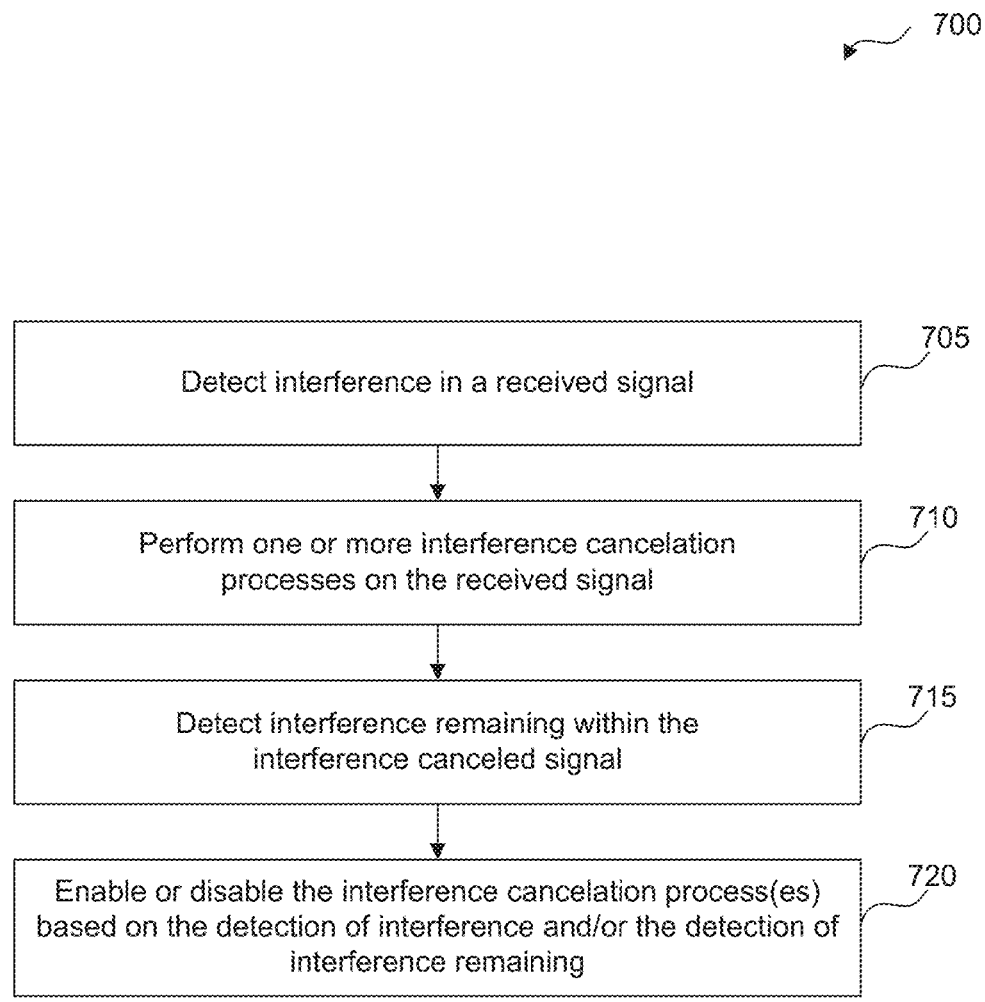
FIG. 7 illustrates an interference cancellation method according to an exemplary aspect of the present disclosure.

FIG. 7 illustrates a flowchart 700 of an interference cancellation method according to an exemplary aspect of the present disclosure. The method of flowchart 700 is described with continued reference to one or more of FIGS. 1-6. The steps of the method of flowchart 700 are not limited to the order described below, and the various steps may be performed in a different order. Further, two or more steps of the method of flowchart 700 may be performed simultaneously with each other.

The method of flowchart 700 begins at step 705, where interference is detected in a received signal. For example, interference detector 410.1 can be configured to detect interference within a received signal. In an exemplary aspect, the detection of interference can utilize one or more pilot signals, preambles, synchronization sequences, spreading sequences, and/or DMRS symbols of one or more PUSCHs within and/or associated with one or more transmitted (or to be transmitted) signals. Further, the detection of interference can include correlating the received signal with at least a portion of a transmitted signal, where the portion of the signal includes, for example, a DMRS symbol.

After step 705, the method of flowchart 700 transitions to step 710, where one or more interference cancellation processes are performed on the received signal. For example, the interference cancellation processes can be performed by the interference canceler 405. The interference cancellation processes can be performed based on the interference that has been detected in the received signal.

After step 710, the method of flowchart 700 transitions to step 715, where, interference remaining within the interference canceled signal is detected. For example, For example, interference detector 410.2 can be configured to detect interference remaining within the interference canceled signal.

After step 715, the method of flowchart 700 transitions to step 720, where the interference cancellation processes are enabled or disabled based on the detection of interference within the received signal and/or on the detection of remaining interference within the interference canceled signal. For example, the controller 420 can be configured to determine whether an amount of interference within a received signal necessitates interference cancellation processes to be performed on the received signal, and whether such processes were sufficiently successfully in canceling the detected interference.

Example 1 is an interference cancellation device, comprising a first interference detector configured to detect interference within a received communication signal; an interference canceler configured to cancel the interference to generate an interference canceled signal; a second interference detector configured to detect remaining interference within the interference canceled signal; and a controller configured to enable or disable the interference canceler based on the detection of the first interference detector and the detection of the second interference detector.

In Example 2, the subject matter of Example 1, further comprising a receiver configured to receive the received communication signal; and a transmitter configured to transmit a transmitted communication signal, wherein at least one of the interference and the remaining interference comprises self-interference between the received and transmitted communication signals.

In Example 3, the subject matter of Example 1, wherein the first interference detector comprises a correlator configured to correlate the received communication signal with a portion of a transmitted signal to generate a correlated signal, the first interference detector being configured to utilize the correlated signal to detect the interference between the received and transmitted communication signals.

In Example 4, the subject matter of Example 3, wherein the portion of the transmitted signal includes at least one demodulation reference signal (DMRS) symbol of a physical uplink shared channel (PUSCH).

In Example 5, the subject matter of Example 3, wherein the portion of the transmitted signal includes a pilot signal, a preamble, a synchronization sequence, or a spreading sequence.

In Example 6, the subject matter of Example 3, wherein the controller is configured to enable or disable the interference canceler based the correlated signal.

In Example 7, the subject matter of Example 3, wherein the first interference detector further comprises a threshold generator configured to generate an interference threshold value; and a detector configured to compare the interference threshold value and the correlated signal to generate a detection signal, the controller being configured to enable or disable the interference canceler based on the detection signal.

In Example 8, the subject matter of Example 7, wherein the threshold generator is configured to generate a fading memory average of the correlated signal to generate the interference threshold value.

In Example 9, the subject matter of Example 1, wherein the second interference detector comprises a correlator configured to correlate the interference canceled signal with a portion of a transmitted signal to generate a correlated signal, the second interference detector being configured to utilize the correlated signal to detect the remaining inference within the interference canceled signal.

In Example 10, the subject matter of Example 9, wherein the second interference detector further comprises a threshold generator configured to generate an interference threshold value; and a detector configured to compare the interference threshold value and the correlated signal to generate a detection signal, the controller being configured to enable or disable the interference canceler based on the detection signal.

In Example 11, the subject matter of Example 10, wherein the threshold generator is configured to generate a fading memory average of the correlated signal to generate the interference threshold value.

In Example 12, the subject matter of Example 1, wherein the first interference detector comprises a first correlator configured to correlate the communication signal with a portion of a transmitted signal to generate a first correlated signal; a first threshold generator configured to generate a first interference threshold value; and a first detector configured to compare the first interference threshold value and the first correlated signal to generate a first detection signal. The second interference detector comprises a second correlator configured to correlate the interference canceled signal with the portion of the transmitted signal to generate a second correlated signal; a second threshold generator configured to generate a second interference threshold value; and a second detector configured to compare the second interference threshold value and the second correlated signal to generate a second detection signal; and wherein the controller is configured to enable or disable the interference canceler based on the first detection signal and the second detection signal.

Example 13 is a modem comprising the interference cancellation device of Example 1.

Example 14 is a wireless communication device comprising the interference cancellation device of Example 1.

Example 15 is an interference cancellation method, comprising detecting, by a first interference detector, interference within a received communication signal; canceling, by an interference canceler, the interference in the received communication signal to generate an interference canceled signal; detecting, by a second interference detector, remaining interference within the interference canceled signal; and enabling or disabling, by a controller, the cancellation of the interference based on the detection by the first interference detector and the detection by the second interference detector.

In Example 16, the subject matter of Example 15, wherein the canceling the interference comprises canceling self-interference between the received signal and a transmitted communication signal.

In Example 17, the subject matter of Example 15, wherein the canceling the interference comprises canceling self-interference between the received signal and a portion of a transmitted communication signal.

In Example 18, the subject matter of Example 15, wherein the detecting the interference comprises correlating the received communication signal with a portion of a transmitted signal to generate a correlated signal.

In Example 19, the subject matter of Example 18, wherein the correlating the received communication signal with the portion of the transmitted signal comprises correlating the received communication signal with at least one demodulation reference signal (DMRS) symbol of a physical uplink shared channel (PUSCH) of the transmitted signal.

In Example 20, the subject matter of Example 18, wherein the correlating the received communication signal with a pilot signal, a preamble, a synchronization sequence, or a spreading sequence associated with the transmitted signal.

In Example 21, the subject matter of Example 18, wherein the enabling or disabling the cancellation of the interference comprises enabling or disabling the cancellation of the interference based on the correlated signal.

In Example 22, the subject matter of Example 18, wherein the detecting the interference comprises generating, by a threshold generator, an interference threshold value; and comparing, by a detector, the interference threshold value and the correlated signal; and wherein the enabling or disabling the cancellation of the interference comprises enabling or disabling the cancellation of the interference based on the comparison.

Example 23 is a computer program product embodied on a non-transitory computer-readable medium comprising program instructions configured such that when executed by processing circuitry cause the processing circuitry to implement the method of Example 15.

Example 24 is a n interference cancellation device, comprising first interference detection means for detecting interference within a received communication signal; interference canceling means for canceling the interference in the received communication signal to generate an interference canceled signal; second interference detection means for detecting remaining interference within the interference canceled signal; and controlling means for enabling or disabling the cancellation of the interference based on the detection by the first interference detecting means and the detection by the second interference detecting means.

In Example 25, the subject matter of Example 24, wherein the first interference detection means comprises first correlating means for correlating the communication signal with a portion of a transmitted signal to generate a first correlated signal; first threshold generation means for generating a first interference threshold value; and first detecting means for comparing the first interference threshold value and the first correlated signal to generate a first detection signal. The second interference detection means comprises second correlating means for correlating the interference canceled signal with the portion of the transmitted signal to generate a second correlated signal; second threshold generation means for generating a second interference threshold value; and second detecting means for comparing the second interference threshold value and the second correlated signal to generate a second detection signal. The controlling means are configured for enabling or disabling the interference canceling means based on the first detection signal and the second detection signal.

In Example 26, the subject matter of any of Examples 1-2, wherein the first interference detector comprises a correlator configured to correlate the received communication signal with a portion of a transmitted signal to generate a correlated signal, the first interference detector being configured to utilize the correlated signal to detect the interference between the received and transmitted communication signals.

In Example 27, the subject matter of any of Examples 1-2, wherein the second interference detector comprises a correlator configured to correlate the interference canceled signal with a portion of a transmitted signal to generate a correlated signal, the second interference detector being configured to utilize the correlated signal to detect the remaining inference within the interference canceled signal.

In Example 28, the subject matter of any of Examples 1-2, wherein the first interference detector comprises a first correlator configured to correlate the communication signal with a portion of a transmitted signal to generate a first correlated signal; a first threshold generator configured to generate a first interference threshold value; and a first detector configured to compare the first interference threshold value and the first correlated signal to generate a first detection signal. The second interference detector comprises a second correlator configured to correlate the interference canceled signal with the portion of the transmitted signal to generate a second correlated signal; a second threshold generator configured to generate a second interference threshold value; and a second detector configured to compare the second interference threshold value and the second correlated signal to generate a second detection signal; and wherein the controller is configured to enable or disable the interference canceler based on the first detection signal and the second detection signal.

Example 29 is a modem comprising the interference cancellation device of any of Examples 1-12.

Example 30 is a wireless communication device comprising the interference cancellation device of any of claims 1-12.

In Example 31, the subject matter of any of Examples 15-17, wherein the detecting the interference comprises correlating the received communication signal with a portion of a transmitted signal to generate a correlated signal.

Example 32 is a computer program product embodied on a non-transitory computer-readable medium comprising program instructions configured such that when executed by processing circuitry cause the processing circuitry to implement the method of any of Examples 15-22.

Example 33 is an apparatus substantially as shown and described.

Example 34 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect of the present disclosure. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

In aspects having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. An interference cancellation device, comprising:
    a first interference detector configured to detect interference in a communication signal, wherein the first interference detector configured to:
        generate an interference threshold value based on a correlated signal generated from a correlation of the communication signal and at least a portion of a transmitted communication signal; and
        detect the interference within the communication signal based on the correlated signal and the interference threshold value;
    an interference canceler configured to cancel the detected interference in the communication signal to generate an interference canceled signal;

a second interference detector configured to process the interference canceled signal from the interference canceler to determine remaining interference in the interference canceled signal; and a controller configured to activate or deactivate the interference canceler based on the detected interference by the first interference detector and the determined interference by the second interference detector.

2. The interference cancellation device of claim 1, further comprising:

a receiver configured to receive the communication signal; and a transmitter configured to transmit the transmitted communication signal, wherein at least one of the interference and the remaining interference comprises self-interference between the received and transmitted communication signals.

3. The interference cancellation device of claim 1, wherein the first interference detector comprises:

a correlator configured to correlate the communication signal with the portion of the transmitted communication signal to generate the correlated signal.

4. The interference cancellation device of claim 3, wherein the portion of the transmitted communication signal includes at least one demodulation reference signal (DMRS) symbol of a physical uplink shared channel (PUSCH).

5. The interference cancellation device of claim 3, wherein the portion of the transmitted communication signal includes a pilot signal, a preamble, a synchronization sequence, or a spreading sequence.

6. The interference cancellation device of claim 3, wherein the controller is configured to activate or deactivate the interference canceler based on the correlated signal.

7. The interference cancellation device of claim 3, wherein the first interference detector further comprises:

a threshold generator configured to generate the interference threshold value; and a detector configured to compare the interference threshold value and the correlated signal to generate a detection signal, the controller being configured to activate or deactivate the interference canceler based on the detection signal.

8. The interference cancellation device of claim 7, wherein the threshold generator is configured to generate a fading memory average of the correlated signal to generate the interference threshold value.

9. The interference cancellation device of claim 1, wherein the second interference detector comprises:

a correlator configured to correlate the interference canceled signal with the portion of the transmitted communication signal to generate another correlated signal, the second interference detector being configured to utilize the other correlated signal to detect the remaining inference within the interference canceled signal.

10. The interference cancellation device of claim 9, wherein the second interference detector further comprises:

a threshold generator configured to generate an interference threshold value; and a detector configured to compare the interference threshold value and the other correlated signal to generate a detection signal, the controller being configured to activate or deactivate the interference canceler based on the detection signal.

11. The interference cancellation device of claim 10, wherein the threshold generator is configured to generate a fading memory average of the other correlated signal to generate the interference threshold value.

12. The interference cancellation device of claim 1, wherein the first interference detector comprises:

a first correlator configured to correlate the communication signal with the portion of the transmitted communication signal to generate the correlated signal;

a first threshold generator configured to generate the interference threshold value; and a first detector configured to compare the interference threshold value and the correlated signal to generate a first detection signal;

wherein the second interference detector comprises:

a second correlator configured to correlate the interference canceled signal with the portion of the transmitted signal to generate another correlated signal;

a second threshold generator configured to generate another interference threshold value; and a second detector configured to compare the other interference threshold value and the other correlated signal to generate a second detection signal; and wherein the controller is configured to activate or deactivate the interference canceler based on the first detection signal and the second detection signal.

13. A modem comprising the interference cancellation device of claim 1.

14. A wireless communication device comprising the interference cancellation device of claim 1.

15. The interference cancellation device of claim 1, wherein the second interference detector is configured to directly receive the interference canceled signal from the interference canceler.

16. The interference cancellation device of claim 1, wherein the interference within the communication signal detected by the first interference detector comprises self-interference between the communication signal and the transmitted communication signal transmitted by the interference cancellation device.

17. An interference cancellation method, comprising:

detecting, by a first interference detector, interference in a communication signal, the detecting including generating an interference threshold value based on a correlated signal generated from a correlation of the communication signal and at least a portion of a transmitted communication signal, wherein the detection of the interference is based on the correlated signal and the interference threshold value;

canceling, by an interference canceler, the interference in the communication signal to generate an interference canceled signal;

providing the interference canceled signal from the interference canceler to a second interference detector;

processing, by the second interference detector, the interference canceled signal to determine remaining interference within the interference canceled signal; and activating or deactivating, by a controller, the cancellation of the interference based on the detected interference by the first interference detector and the determined remaining interference by the second interference detector.

18. The interference cancellation method of claim 17, wherein the canceling the interference comprises canceling self-interference between the communication signal and the portion of the transmitted communication signal, the communication signal being a received communication signal.

19. The interference cancellation method of claim 17, wherein the canceling the interference comprises canceling self-interference between the communication signal and the portion of the transmitted communication signal.

20. The interference cancellation method of claim 17, wherein the detecting the interference comprises correlating the communication signal with the portion of the transmitted communication signal to generate the correlated signal.

21. The interference cancellation method of claim 20, wherein the correlating the communication signal with the portion of the transmitted communication signal comprises correlating the communication signal with at least one demodulation reference signal (DMRS) symbol of a physical uplink shared channel (PUSCH) of the transmitted communication signal.

22. The interference cancellation method of claim 20, wherein the correlating the communication signal comprises correlating the communication signal with a pilot signal, a preamble, a synchronization sequence, or a spreading sequence associated with the transmitted communication signal.

23. The interference cancellation method of claim 20, wherein the activating or deactivating the cancellation of the interference comprises activating or deactivating the cancellation of the interference based on the correlated signal.

24. The interference cancellation method of claim 20, wherein the detecting the interference comprises:
comparing, by a detector, the interference threshold value and the correlated signal; and
wherein the activating or deactivating the cancellation of the interference comprises activating or deactivating the cancellation of the interference based on the comparison.

25. A computer program product embodied on a non-transitory computer-readable medium comprising program instructions configured such that when executed by processing circuitry cause the processing circuitry to implement the method of claim 17.

26. An interference cancellation device, comprising:
first interference detection means for detecting interference in a communication signal, wherein the first interference detection means is configured to:
generate an interference threshold value based on a correlated signal generated from a correlation of the communication signal and at least a portion of a transmitted communication signal; and
detect the interference within the communication signal based on the correlated signal and the interference threshold value;
interference canceling means for canceling the interference in the communication signal to generate an interference canceled signal;
second interference detection means for processing the interference canceled signal from the interference canceling means to determine remaining interference in the interference canceled signal; and
controlling means for activate or deactivate the cancellation of the interference based on the detected interference by the first interference detecting means and the determined remaining interference by the second interference detecting means.

27. The interference cancellation device of claim 26, wherein the first interference detection means comprises:
first correlating means for correlating the communication signal with the portion of the transmitted communication signal to generate the correlated signal;
first threshold generation means for generating the interference threshold value; and
first detecting means for comparing the interference threshold value and the correlated signal to generate a first detection signal;
wherein the second interference detection means comprises:
second correlating means for correlating the interference canceled signal with the portion of the transmitted communication signal to generate another correlated signal;
second threshold generation means for generating another interference threshold value; and
second detecting means for comparing the other interference threshold value and the other correlated signal to generate a second detection signal; and
wherein the controlling means are configured for activating or deactivating the interference canceling means based on the first detection signal and the second detection signal.

* * * * *